(12) United States Patent
Kolo

(10) Patent No.: US 8,938,670 B2
(45) Date of Patent: Jan. 20, 2015

(54) METHODS AND SYSTEMS FOR AUTOMATED LANGUAGE IDENTIFICATION

(76) Inventor: Brian Andrew Kolo, Leesburg, VA (US)

( * ) Notice: Subject to any disclaimer, the term of this patent is extended or adjusted under 35 U.S.C. 154(b) by 927 days.

(21) Appl. No.: 13/072,756

(22) Filed: Mar. 27, 2011

(65) Prior Publication Data

US 2012/0246564 A1    Sep. 27, 2012

(51) Int. Cl.
G06F 17/20 (2006.01)
G06F 17/00 (2006.01)
G06F 17/28 (2006.01)

(52) U.S. Cl.
CPC .................................. *G06F 17/2863* (2013.01)
USPC ............................................ 715/264; 706/45

(58) Field of Classification Search
CPC ..... G06F 17/289; G06F 17/275; G06F 17/21; G06F 17/2765; G06F 17/2863
USPC .......................................... 715/264, 265, 703
See application file for complete search history.

(56) References Cited

U.S. PATENT DOCUMENTS

| | | | |
|---|---|---|---|
| 6,704,698 B1 * | 3/2004 | Paulsen et al. ..................... 704/1 |
| 8,014,591 B2 * | 9/2011 | Baker ............................. 382/159 |
| 8,027,832 B2 * | 9/2011 | Ramsey et al. .................... 704/9 |
| 8,185,376 B2 * | 5/2012 | Chu et al. .......................... 704/8 |
| 8,204,751 B1 * | 6/2012 | Di Fabbrizio et al. ......... 704/275 |
| 8,539,349 B1 * | 9/2013 | Kirshenbaum ............... 715/264 |

OTHER PUBLICATIONS

Samy Bengio, Statistical Machine Learning from Data—Gaussian Mixture Models, Jan. 23, 2006, 5-10; 16; 21.*
Jia Li, Hidden Markov Model, Nov. 21, 2008, 1-16.*
Phil Gregory, Introduction to Bayesian Data Analysis, Mar. 16, 2010, 1-54.*

* cited by examiner

*Primary Examiner* — Cesar Paula
*Assistant Examiner* — Hassan Mrabi

(57) ABSTRACT

The invention is to system and methods for automatically identifying the language(s) contained in text. The system comprises two language classifiers, one that classifies the text based on the letters present, and a second classifier that classifies the text based on the words present. Each classifier produces a list of languages and a weight for each language. Each classifier also computes an overall confidence applied to the classifier as a whole. The results of the classifiers are combined together incorporating the classifier confidence and language weights. The combined results produce a list of languages and weights and an overall confidence.

3 Claims, 11 Drawing Sheets

English

| Pattern | Count | Frequency |
|---|---|---|
| jacob | 1500 | 0.182 |
| koka | 500 | 0.061 |
| a | 6000 | 0.727 |
| jacob,koka | 250 | 0.030 |

Spanish

| Pattern | Count | Frequency |
|---|---|---|
| jacob | 1000 | 0.073 |
| loko | 3000 | 0.218 |
| a | 9000 | 0.655 |
| jacob,loko | 750 | 0.055 |

English Exclusive

| |
|---|
| koka |
| jacob,koka |

Spanish Exclusive

| |
|---|
| loko |
| jacob,loko |

English-Spanish Common

| |
|---|
| jacob |
| a |

English

| Pattern | Count | Frequency |
|---|---|---|
| jacob | 1500 | 0.182 |
| koka | 500 | 0.061 |
| a | 6000 | 0.727 |
| jacob,koka | 250 | 0.030 |

Spanish

| Pattern | Count | Frequency |
|---|---|---|
| jacob | 1000 | 0.073 |
| loko | 3000 | 0.218 |
| a | 9000 | 0.655 |
| jacob,loko | 750 | 0.055 |

English-Spanish Common

| |
|---|
| jacob |
| a |

Spanish Exclusive

| |
|---|
| loko |
| jacob,loko |

English Exclusive

| |
|---|
| koka |
| jacob,koka |

Figure 8

| Pattern | English | | | Spanish | | |
| --- | --- | --- | --- | --- | --- | --- |
| | English | Spanish | Both | English | Spanish | Both |
| jacob | 1500 | 0 | 3000 | 0 | 500 | 100 |
| a | 3000 | 0 | 1500 | 0 | 7000 | 4000 |

| Pattern | English | | | Spanish | | |
| --- | --- | --- | --- | --- | --- | --- |
| | English | Spanish | Both | English | Spanish | Both |
| jacob | 0.33333 | 0 | 0.66667 | 0 | 0.83333 | 0.16667 |
| a | 0.66667 | 0 | 0.33333 | 0 | 0.63636 | 0.36364 |

METHODS AND SYSTEMS FOR AUTOMATED LANGUAGE IDENTIFICATION

BACKGROUND

Computers are becoming readily available to people around the world. As such, a growing number of people using computers speak a language other than English.

In addition, there are a number of software programs that desire to present a customized user experience based on the native language of the person using the software. To facilitate this customization, software programs may need to automatically identify the native language of a user.

SUMMARY

The instant invention is directed to automatically identifying the language of a text document. The system is presented text and is asked to determine the language (or languages) contained in the text. The text may be short containing only a few characters, or it may be long comprising several pages.

Moreover, the text may contain a plurality of languages. In this case, the system is asked to identify each region of the text that contains a specific language.

BRIEF DESCRIPTION OF THE DRAWINGS

FIG. 8 is an illustration detailing the computation of the frequency of patterns based on counts. The figure also shows the patterns exclusive to each language and the patterns common to both.

FIG. 9 is an illustration showing results of counting each common pattern in relation to its neighboring patterns.

FIG. 10 is an illustration of a simple threshold for determining the association of a common patter with either one language, both, or neither.

DETAILED DESCRIPTION OF ILLUSTRATIVE EMBODIMENTS

Figure 1:
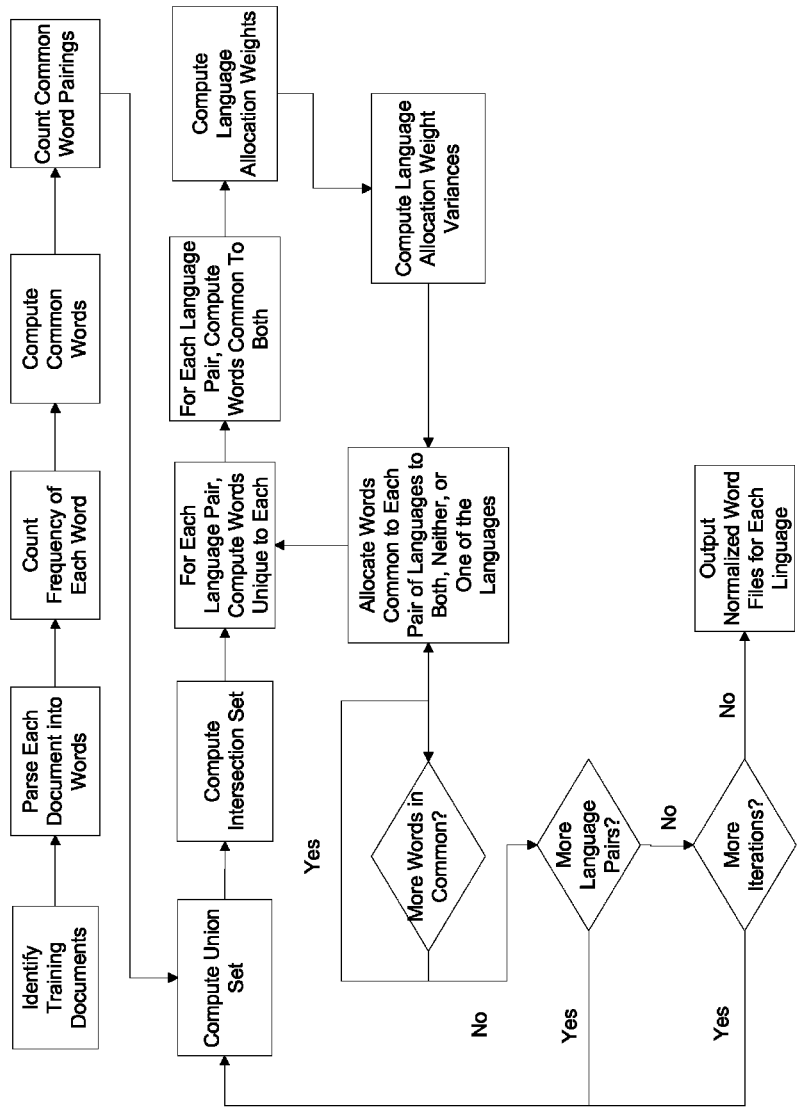
FIG. 1 is an illustration of the process for Data Preparation for the Word Classifier.

Text language may be broken into individual words. Each word is comprised of one or more letters. One approach to language classification is to examine the words of the text and compare these to a list of words associated with the language.

To this end, a first step in building a text classifier is to create a list of words associated with each language under consideration. Many languages have large amounts of text available online. Downloading text from the web for each language provides an initial source of text for a language.

However, this method has the drawback that many web text files have more than one language embedded in the document. For example, text from a Chinese website may have English text embedded in the document.

This leads to a circular problem. In order to build a language classifier, we need to identify a pure source of language text. However, in order to get pure language text, we need a language classifier to separate the languages in the text. We present a method for separating the languages in such mixed text files even though we do not know precisely how to separate the text initially Language Identification on Words Data Preparation A language classifier is often enhanced by compiling a list of words associated with each particular language. This section details the preparation phase for such data. This section assumes the existence of some set of machine readable documents where each document is associated with a principal language. These documents may have other language text embedded within. Alternatively, some documents may be associated with one language while the text is predominately or even entirely in another language. The process described in this section is capable of determining which words are associated with each language even when some of the input documents have other languages, or even when documents are incorrectly associated with one language but written entirely in another language. Based on this input, the process produces lists of common words for each language. These lists may be used to enhance the language classifiers described in the next sections.

The text used here is often called training text. This text is used to create or train language classifiers and is distinguished from input text that is presented to a classifier for the purpose of determining the underlying language of the text.

First, identify training documents that are associated with each language. Our initial investigations lead us to believe that 100-1000 such documents are sufficient when there are at least 10 words in each document. Shorter documents may be included in this set, but longer documents are preferred. If only short documents are available, we recommend 500-5000 documents.

Second, for each language, parse each document into a set of words. Normalize each word by case-folding. Simple case-folding may be implemented as making all characters lower case. However, in some languages this process is ambiguous. Another method is to first make all letter upper case, then make the result lower case. This addresses many problems encountered when using Unicode to represent the characters. The use of Unicode is highly recommended as Unicode supports a wide-variety of language scripts.

Also part of this step is the removal of punctuation. Symbols such as '.', ';', '!', '@', '#', '$', '%', '^', '*', '(',')', '{','}', '[',']', '\', ':', '?', '<', '>', '/', '"', '|', '~', '+', '−' and ''' are a few of the symbols that may be removed from the text. It should be appreciated that removal of punctuation may include other symbols than those presented here, combination of symbols may be used (where two of more symbols appear together), or some of the above symbols may be removed. In the simplest case, removing punctuation symbols may use no symbols at all in which case this part of the step is ignored.

Third, count the number of appearances of each normalized word. Normalize this by dividing each frequency by the total number words in all documents for the particular language. The normalized value is the frequency of the word in tat language. The sum of the frequencies of all words in a given language should sum to one.

Fourth, rank order the word list for each language from highest frequency to lowest frequency. Specify a cutoff value to truncate the word list. The cutoff value may be expressed as a word frequency, or it may be a total number of words. Alternatively, all words may be used.

Fifth, for each language, record the pairing of each rank ordered word (words surviving the cutoff) with the previous and next normalized words in each document. If the next or previous normalized words is not a rank ordered word, skip the occurrence. If the next normalized word is a rank ordered word, count the number of times this word combination appears. The pairing data for language A is represented as $P_A(w)$ while the pairing data for language B is represented as $P_B(w)$. This notation means that given a particular word w, $P_A(w)$ is the list of rank ordered words that are paired with w. This may also include the frequency count of the pairing as well.

Sixth, for each pair of languages, create the union set of the rank ordered word lists for both the languages. The union set is the set of unique words that appear in either set. Thus, if one set has words A and B, and the other set has words B and C, the union set is A, B, and C. Note that B appears only once in the union set because the union set is a set of unique words.

Let $R_A$ and $R_B$ be the rank ordered word lists of the two languages. The union set is expressed as $U_{AB} = R_A \cup R_B$.

Seventh, identify the intersection of words between the languages. The intersection is the set of unique words that appear in both languages. Thus, if one set has words A and B, and the other set has words B and C, the intersection set is A and C.

Let $R_A$ and $R_B$ be the rank ordered word lists of the two languages. The intersection set is expressed as $I_{AB} = R_A \cap R_B$.

Eighth, identify the words that are exclusive to each language in the language pair. These are the words that appear on the rank ordered word list for one language but not the other. The exclusive word list for each language may be computed from the previous results. The exclusive words for language A are $E_A = R_A - I_{AB}$. The exclusive words for language B are $E_B = R_B - I_{AB}$.

Ninth, examine each of the rank ordered words that are common to the two languages. This is the intersection $I_{AB}$. For each rank ordered word w, examine the list of word pairings for each language ($P_A(w)$ and $P_B(w)$). For each paired word in $P_A(w)$, determine if the word is exclusive to A, B, or is on both lists. Mathematically, let $P_A^i(w)$ be the $i^{th}$ rank ordered word paired with w for language A. Since the sets $E_A$, $E_B$, and $I_{AB}$ are mutually exclusive ($I_{AB} \cap E_A = 0$, $I_{AB} \cap E_B = 0$, and $E_B \cap E_A = 0$), then exactly one of three choices must be true: $P_A^i(w) \in E_A$, $P_A^i(w) \in E_B$, or $P_A^i(w) \in I_{AB}$.

For a given rank ordered word w, we count the number of paired words that are exclusive to A ($P_A^i(w) \in E_A$), the number of paired words that are exclusive to B A ($P_A^i(w) \in E_B$), and the number of paired words that are on both lists A and B ($P_A^i(w) \in I_{AB}$). Represent the number of paired words for word w from language A that are exclusive to A be represented as $\pi_A^A(w)$. The number of paired words for word w from language A that are exclusive to B be represented as $\pi_B^A(w)$. Finally, let the number of paired words for word w from language A that are in both A and B be represented as $\pi_{AB}^A(w)$. Optionally, these counts may be weighted by the frequency of each rank ordered word pair, the frequency of the paired word, or the frequency of w. Note, in this embodiment, the quantity $\pi_B^A(w)=0$, but alternative embodiments may have this nonzero.

This process is repeated using the paired words from list B. Similar to above, for a given rank ordered word w, we count the number of paired words that are exclusive to A ($P_B^i(w) \in E_A$), the number of paired words that are exclusive to B A ($P_B^i(w) \in E_B$), and the number of paired words that are on both lists A and B ($P_B^i(w) \in I_{AB}$). Represent the number of paired words for word w from language B that are exclusive to A be represented as $\pi_A^B(w)$. The number of paired words for word w from language B that are exclusive to B be represented as $\pi_B^B(w)$. Finally, let the number of paired words for word w from language A that are in both A and B be represented as $\pi_{AB}^B(w)$. Optionally, these counts may be weighted by the frequency of each rank ordered word pair, the frequency of the paired word, or the frequency of w. Note, in this embodiment, the quantity $\pi_A^B(w)=0$, but alternative embodiments may have this nonzero.

Tenth, compute a weight for allocating w to either language A, language B, or both A and B as follows. The preference of allocating w to language A based on the text assigned to language A is computed as $$\rho_A^A(w) = \frac{\pi_A^A(w)}{\pi_A^A(w) + \pi_B^A(w) + \pi_{AB}^A(w)}$$

The preference of allocating w to language B based on the text assigned to language A is computed as $$\rho_B^A(w) = \frac{\pi_B^A(w)}{\pi_A^A(w) + \pi_B^A(w) + \pi_{AB}^A(w)}$$

The preference of allocating w to both language A and B based on the text assigned to language A is computed as $$\rho_{AB}^A(w) = \frac{\pi_{AB}^A(w)}{\pi_A^A(w) + \pi_B^A(w) + \pi_{AB}^A(w)}$$

In these equations, $\rho_A^A(w) + \rho_B^A(w) + \rho_{AB}^A(w) = 1$.

The preference of allocating w to language A based on the text assigned to language B is computed as $$\rho_A^B(w) = \frac{\pi_A^B(w)}{\pi_A^B(w) + \pi_B^B(w) + \pi_{AB}^B(w)}$$

The preference of allocating w to language B based on the text assigned to language B is computed as $$\rho_B^B(w) = \frac{\pi_B^B(w)}{\pi_A^B(w) + \pi_B^B(w) + \pi_{AB}^B(w)}$$

The preference of allocating w to both language A and B based on the text assigned to language B is computed as $$\rho_{AB}^B(w) = \frac{\pi_{AB}^B(w)}{\pi_A^B(w) + \pi_B^B(w) + \pi_{AB}^B(w)}$$

In these equations, $\rho_A^B(w) + \rho_B^B(w) + \pi_{AB}^B(w) = 1$.

Eleventh, compute the uncertainty of each of the metrics from the previous step. The variance of each of the metrics is:

$$\sigma^2_{\rho^A_A}(w) = \frac{p^A_A(1-\rho^A_A)}{\pi^A_A(w)+\pi^A_B(w)+\pi^A_{AB}(w)}$$

$$\sigma^2_{\rho^A_B}(w) = \frac{p^A_B(1-\rho^A_B)}{\pi^A_A(w)+\pi^A_B(w)+\pi^A_{AB}(w)}$$

$$\sigma^2_{\rho^A_{AB}}(w) = \frac{p^A_{AB}(1-\rho^A_{AB})}{\pi^A_A(w)+\pi^A_B(w)+\pi^A_{AB}(w)}$$

$$\sigma^2_{\rho^B_A}(w) = \frac{p^B_A(1-\rho^B_A)}{\pi^A_A(w)+\pi^A_B(w)+\pi^A_{AB}(w)}$$

$$\sigma^2_{\rho^B_B}(w) = \frac{p^B_B(1-\rho^B_B)}{\pi^A_A(w)+\pi^A_B(w)+\pi^A_{AB}(w)}$$

$$\sigma^2_{\rho^B_{AB}}(w) = \frac{p^B_{AB}(1-\rho^B_{AB})}{\pi^A_A(w)+\pi^A_B(w)+\pi^A_{AB}(w)}$$

The uncertainty for each of the metrics is computed as the square root of the variance.

Twelfth, in this embodiment, $\rho^B_A(w)=\rho^A_B(w)=0$. In this case, there are two parameters that define the system. Since $\rho^A_A(w)+\rho^A_{AB}(w)=1$ and $\rho^B_B(w)+\rho^A_{AB}(w)=1$, there are only two independent parameters. Use the parameters $\rho^A_A(w)$ and $\rho^B_B(w)$ to define the system for the word w. These parameters are on the range $0\leq\rho^A_A(w)\leq 1$ and $0\leq\rho^B_B(w)\leq 1$. The point $(\rho^A_A(w),\rho^B_B(w))$ represents the state of the system for the word w. This point is on the closed space of the unit square.

The closed space of the unit square is divided into four regions. Region A is the set of points $(\rho^A_A(w),\rho^B_B(w))$ where the word w is assigned to language A and is removed from language B. Region B is the set of points $(\rho^A_A(w),\rho^B_B(w))$ where the word w is assigned to language B and is removed from language A. Region AB is the set of points $(\rho^A_A(w),\rho^B_B(w))$ where the word w is assigned to both language A and language B. Region Ø is the set of points $(\rho^A_A(w),\rho^B_B(w))$ where the word w is removed from both language A and language B.

These regions may be created using just a simple threshold. In this case, when $\rho^A_A(w) \geq \rho_{critical}$, the word w is assigned to language A. Moreover, when $\rho^B_B(w) \geq \rho_{critical}$, the word w is assigned to language B.

Alternatively, the regions may be created with more complicated geometries. In this case, the problem of assigning w to a language results in a multiobjective optimization problem. When language A and B are not preferred over each other, the geometry of the regions should be symmetric about the line $\rho^A_A(w)=\rho^B_B(w)$. However, when the symmetry between languages A and B is broken, the geometry of the regions may not be symmetric.

Based on the location of the point $(\rho^A_A(w),\rho^B_B(w))$, the word w is removed from the list of rank ordered words for language A and/or B. This step represents the evolution of the system from an initial set of rank ordered words to a filtered set.

Thirteenth, the process is repeated from the eighth step forward for each word w in the intersection set $I_{AB}$.

Fourteenth, the process is repeated from the sixth step forward for each pair of languages. If language A and B are treated symmetrically in the process, then the result of examining language A with B is the same as examining language B with A. In this case, we may reduce the total number of language pairs for examination. If there are N languages, examining every pair requires $N^2$ repetitions. If language A and B are treated symmetrically, then only $$\frac{N(N-1)}{2}$$

examinations are required. This count includes examining a language with itself. If this is not desired, than an additional N examinations may be removed resulting in $$\frac{N(N-3)}{2}$$

examinations.

Fifteenth, the process is repeated iteratively from the fourth step forward. Each iteration removes words from each language. This alters the rank ordered word list for each language. Repeating the process iteratively converges each language to a fixed list of words assigned to the language. The final lists for each language may be written out as computer readable files.

The steps above are presented here for clarity purposes and are not intended to limit the invention. Steps may be modified, combined, run in parallel, or reordered in a variety of ways. This may be done in particular for the purpose of creating efficient algorithms.

Word Classifier

Once a set of rank ordered common words is identified, a word classifier may be created by checking input text against the rank ordered common words. The steps for using a word classifier are detailed below.

First, each list of rank ordered common words is identified. Preferably, these words are read into RAM in a computer and stored therein for fast access. In this case, each word appears uniquely in a list, and each word is associated with a language and a frequency of occurrence.

Second, input text for classification is provided to the classifier. The text may be a single word or a large document. In fact, the text may be contained across multiple documents that are intended to be treated as a single document.

Third, the input text is processed with the methods used in step two and three from the Data Preparation component. By preparing the input text in with the same methods used to prepare the training data, we assure consistency of treatment which increases the likelihood that the normalized inputs are similar to the training inputs. However, some variances between the methods may be allowed to facilitate differences between the input and training sets. For example, the input set may be in a different machine readable formant and may require conversion. Alternatively, the input text may have document section markers that may be exploited to use the best text for classification. There are many reasons to treat the input text a little differently, but it is useful to create normalized input text using a method similar to that used in creating normalized training text.

Fourth, each word in the normalized input text is presented to the list of unique words. The languages associated with the input word is recorded along with the frequency of occurrence for the word in the language. Here, each language is associated with a list of words appearing in the input text associated with the language.

Fifth, step four is repeated for each word in the normalized input text. If a word appears more than one time in the input text, the count of the number of appearances of the word in the input text is recorded.

Sixth, a weight is computed for each language based on the list of words in the text associated with the language. The weight may also incorporate a component based on the number of words appearing in the input text that are not associated with the language. In the one embodiment, the weight is computed by multiplying the frequencies of occurrence of each word in the document associated with the language:

$$\Phi_l \prod_{w_i \in I \cap N_l} f_l(w_i)^{\rho_i}$$

where $\Phi_l$ is the weight associated with language l, I is the set of normalized words from the input text, $N_l$ is the set of normalized words associated with the language, $f_l(w_i)$ is the frequency of the word $w_i$ in language l, and $\rho_i$ is the number of occurrences of $w_i$ in the input text.

In many cases, there are many normalized words associated with each language. In this case, the product in the above formula contains many terms. Because $0 \le f_l(w_i) \le 1$, the resulting weight is often very small. In fact, the resulting weight may be too small to be represented by a computer using traditional variables. Because of this, it is preferred to compute the logarithm of the weight. Here, the weight is computed as $$\Phi_l \prod_{w_i \in I \cap N_l} \rho_i \ln(f_l(w_i))$$

This representation is easier to use because the summation typically remains computable even though the product does not.

In the preferred embodiment, the weight is corrected with a factor for each word that does not appear in a language. Let $\bar{f}_l$ be the minimum weight for any word in language l. Let $\bar{f}$ be the minimum weight for any word in any language. A minimum factor for each language is computed. There are many methods for computing such a factor. Let $\mu_l$ be the minimum factor for language l. Different embodiments may use different factors. Some typical factors are $$\mu_l = \bar{f}_l$$

$$\mu_l = \bar{f}_l / K$$

$$\mu_l = \bar{f}$$

$$\mu_l = \bar{f} / K$$

where K is a scaling factor and typically $K \ge 1$. Our experimentation suggest the best mode for the invention is using the last factor with K=10.

The minimum factor represents the probability that language l is not the correct language given that a word is not associated with the language. The weight associated based on words not associated with language l is given by $$\Psi_l = \prod_{w_i \in I - I \cap N_l} (1 - \mu_l) = (1 - \mu_l)^{|I - I \cap N_l|}$$

In logarithmic form, $$\Psi_l = \sum_{w_i \in I - I \cap N_l} \ln(1 - \mu_l) = |I - I \cap N_l| \ln(1 - \mu_l)$$

The overall weight associated with language l is given by summing these together:

$$\Omega_l = \Phi_l + \Psi_l$$

Seventh, an uncertainty is computed for the weight associated with each language. In the preferred embodiment, the weight for a language is computed as $$\Omega_l = \prod_{w_i \in I \cap N_l} f_l(w_i)^{\rho_i} + (1 - \mu_l)^{|I - I \cap N_l|}$$

or $$\Omega_l = \sum_{w_i \in I \cap N_l} \rho_i \ln(f_l(w_i)) + |I - I \cap N_l|(1 - \mu_l)$$

The associated variance is computed as $$\sigma_{\Omega_l}^2 = \frac{1}{N} \sum_{w_i \in I \cap N_l} \rho_i f_l(w_i)(1 - f_l(w_i)) + \frac{|I - I \cap N_l|}{N} \mu_l(1 - \mu_l)$$

or $$\sigma_{\Omega_l}^2 = \frac{1}{N} \sum_{w_i \in I \cap N_l} \rho_i (1 - f_l(w_i)) + \frac{|I - I \cap N_l|}{N} \mu_l$$

where N is the total number of normalized words in the input text.

Eighth, the pairwise z-score is computed for each pair of language as $$Z_{AB} = \frac{\Omega_A - \Omega_B}{\sqrt{\sigma_{\Omega_A}^2 + \sigma_{\Omega_B}^2}}$$

Ninth, sort the weights $\Omega_l$ by decreasing weight. The highest weight is the presumptive language classification for the text. Normalize the weights according to $$\hat{\Omega}_i = \frac{\Omega_i}{\sum_{l \in L} \Omega_l}$$

where L is the set of distinct languages under consideration. The normalized weights are on the range $0 \le \hat{\Omega}_i \le 1$.

The uncertainties may be normalized as well according to $$\hat{\sigma}_{\Omega_l}^2 = \frac{\sigma_{\Omega_l}^2}{\left[\sum_{l \in L} \Omega_l\right]^2}$$

In the preferred embodiment, the output of the classifier is the rank ordered values $\vec{\Omega}$ along with the associated variances $\vec{\sigma}_{\Omega_l}^2$.

Some embodiments desire a single language choice as the output. In this case, we may simply select the largest $\Omega_i$. Alternatively, the error analysis may be incorporated into the selection. In this case, first identify the maximum weight. Let the language associated with the maximum weight be M. Find all languages i such that $$z_{Mi} < z_c$$

where $z_c$ is some threshold z-score. In this case we have identified all languages that are statistically the same for their weight as language M. From these, select the language that has the minimum value for $\vec{\sigma}_{\Omega_j}^2$. This represents the language that is considered statistically the best, but has the least uncertainty in the value of the weight.

The steps above are presented here for clarity purposes and are not intended to limit the invention. Steps may be modified, combined, run in parallel, or reordered in a variety of ways. This may be done in particular for the purpose of creating efficient algorithms.

Language Identification on Letters

Another approach to identifying the language associated with some input text is by examining the letters present in the input text. This Letter Classifier may be constructed in a manner similar to the Word Classifier described above.

Data Preparation

A language classifier may be enhanced by compiling a list of letters associated with each particular language. This section details the preparation phase for such data. This section assumes the existence of some set of machine readable documents where each document is associated with a principal language. These documents may have other language text embedded within. Alternatively, some documents may be associated with one language while the text is predominately or even entirely in another language. The process described in this section is capable of determining which letters are associated with each language even when some of the input documents have other languages, or even when documents are incorrectly associated with one language but written entirely in another language. Based on this input, the process produces lists of common letters for each language. These lists may be used to enhance the language classifiers described in the next sections.

The text used here is often called training text. This text is used to create or train language classifiers and is distinguished from input text that is presented to a classifier for the purpose of determining the underlying language of the text.

First, identify text documents that are associated with each language. Our initial investigations lead us to believe that 100-1000 such documents are sufficient when there are at least 10 letters in each document. Shorter documents may be included in this set, but longer documents are preferred. If only short documents are available, we recommend 500-5000 documents.

Second, for each language, parse each document into a set or letters. Normalize each letters by case-folding. Simple case-folding may be implemented as making all characters lower case. However, in some languages this process is ambiguous. Another method is to first make all letters upper case, then make the result lower case. This addresses many problems encountered when using Unicode to represent the characters. The use of Unicode is highly recommended as Unicode supports a wide-variety of language scripts.

Also part of this step is the removal of punctuation. Symbols such as '.', ';', '!', '@', '#', '$', '%', '^', '*', '(',')', '{','}', '[',']', '\', ':', '?', '<', '>', '/', '"', '|', '~', '+', '−' and ''' are a few of the symbols that may be removed from the text. It should be appreciated that removal of punctuation may include other symbols than those presented here, combination of symbols may be used (where two of more symbols appear together), or some of the above symbols may be removed. In the simplest case, removing punctuation symbols may use no symbols at all in which case this part of the step is ignored.

Third, count the number of appearances of each normalized letter. Normalize this by dividing each frequency by the total number letters in all documents for the particular language. The normalized value is the frequency of the letters in tat language. The sum of the frequencies of all letters in a given language should sum to one.

Fourth, rank order the letter list for each language from highest frequency to lowest frequency. Specify a cutoff value to truncate the letter list. The cutoff value may be expressed as a letter frequency, or it may be a total number of letters. Alternatively, all letters may be used.

Fifth, for each language, record the pairing of each rank ordered letter (letters surviving the cutoff) with the previous and next normalized letters in each document. If the next or previous normalized letter is not a rank ordered letter, skip the occurrence. If the next normalized letter is a rank ordered letter, count the number of times this letters combination appears. The pairing data for language A is represented as $P_A(w)$ while the pairing data for language B is represented as $P_B(w)$. This notation means that given a particular letter w, $P_A(w)$ is the list of rank ordered letters that are paired with w. This may also include the frequency count of the pairing as well.

Sixth, for each pair of languages, create the union set of the rank ordered letter lists for both the languages. The union set is the set of unique letters that appear in either set. Thus, if one set has letters A and B, and the other set has letters B and C, the union set is A, B, and C. Note that B appears only once in the union set because the union set is a set of unique letters.

Let $R_A$ and $R_B$ be the rank ordered letter lists of the two languages. The union set is expressed as $U_{AB} = R_A \cup R_B$.

Seventh, identify the intersection of letters between the languages. The intersection is the set of unique letter that appear in both languages. Thus, if one set has letter A and B, and the other set has letter B and C, the intersection set is A and C.

Let $R_A$ and $R_B$ be the rank ordered letter lists of the two languages. The intersection set is expressed as $I_{AB} = R_A \cap R_B$.

Eighth, identify the letters that are exclusive to each language in the language pair. These are the letters that appear on the rank ordered letter list for one language but not the other. The exclusive letter list for each language may be computed from the previous results. The exclusive letters for language A are $E_A = R_A - I_{AB}$. The exclusive letters for language B are $E_B = R_B - I_{AB}$.

Ninth, examine each of the rank ordered letters that are common to the two languages. This is the intersection $I_{AB}$. For each rank ordered letter w, examine the list of letter pairings for each language ($P_A(w)$ and $P_B(w)$). For each paired letter in $P_A(w)$, determine if the letter is exclusive to A, B, or is on both lists. Mathematically, let $P_A^i(w)$ be the $i^{th}$ rank ordered letter paired with w for language A. Since the sets $E_A$, $E_B$, and $I_{AB}$ are mutually exclusive ($I_{AB} \cap E_A = 0$, $I_{AB} \cap E_B = 0$, and $E_B \cap E_A = 0$), then exactly one of three choices must be true: $P_A^i(w) \in E_A$, $P_B^i(w) \in E_B$, or $P_A^i(w) \in I_{AB}$.

For a given rank ordered letter w, we count the number of paired letters that are exclusive to A ($P_A^i(w) \in E_A$), the number of paired letters that are exclusive to B A ($P_A^i(w) \in E_B$), and the number of paired letters that are on both lists A and B ($P_A^i(w) \in I_{AB}$). Represent the number of paired letters for letter w from language A that are exclusive to A be represented as $\pi_A^A(w)$. The number of paired letters for letter w from language A that are exclusive to B be represented as $\pi_A^B(w)$. Finally, let the number of paired letters for letter w from language A that are in both A and B be represented as $\pi_{AB}^A(w)$. Optionally, these counts may be weighted by the frequency of each rank ordered letter pair, the frequency of the paired letter, or the frequency of w. Note, in this embodiment, the quantity $\pi_A^A(w)=0$, but alternative embodiments may have this nonzero.

This process is repeated using the paired letters from list B. Similar to above, for a given rank ordered letter w, we count the number of paired letters that are exclusive to A ($P_B^i(w) \in E_A$), the number of paired letters that are exclusive to B A ($P_B^i(w) \in E_B$), and the number of paired letters that are on both lists A and B ($P_B^i(w) \in I_{AB}$). Represent the number of paired letters for letter w from language B that are exclusive to A be represented as $\pi_A^B(w)$. The number of paired letters for letter w from language B that are exclusive to B be represented as $\pi_B^B(w)$. Finally, let the number of paired letters for letter w from language A that are in both A and B be represented as $\pi_{AB}^B(w)$. Optionally, these counts may be weighted by the frequency of each rank ordered letter pair, the frequency of the paired letter, or the frequency of w. Note, in this embodiment, the quantity $\pi_A^B(w)=0$, but alternative embodiments may have this nonzero.

Tenth, compute a weight for allocating w to either language A, language B, or both A and B as follows. The preference of allocating w to language A based on the text assigned to language A is computed as $$\rho_A^A(w) = \frac{\pi_A^A(w)}{\pi_A^A(w) + \pi_B^A(w) + \pi_{AB}^A(w)}$$

The preference of allocating w to language B based on the text assigned to language A is computed as $$\rho_B^A(w) = \frac{\pi_B^A(w)}{\pi_A^A(w) + \pi_B^A(w) + \pi_{AB}^A(w)}$$

The preference of allocating w to both language A and B based on the text assigned to language A is computed as $$\rho_{AB}^A(w) = \frac{\pi_{AB}^A(w)}{\pi_A^A(w) + \pi_B^A(w) + \pi_{AB}^A(w)}$$

In these equations, $\rho_A^A(w)+\rho_B^A(w)+\rho_{AB}^A(w)=1$.

The preference of allocating w to language A based on the text assigned to language B is computed as $$\rho_A^B(w) = \frac{\pi_A^B(w)}{\pi_A^B(w) + \pi_B^B(w) + \pi_{AB}^B(w)}$$

The preference of allocating w to language B based on the text assigned to language B is computed as $$\rho_B^B(w) = \frac{\pi_B^B(w)}{\pi_A^B(w) + \pi_B^B(w) + \pi_{AB}^B(w)}$$

The preference of allocating w to both language A and B based on the text assigned to language B is computed as $$\rho_{AB}^B(w) = \frac{\pi_{AB}^B(w)}{\pi_A^B(w) + \pi_B^B(w) + \pi_{AB}^B(w)}$$

In these equations, $\rho_A^B(w)+\rho_B^B(w)+\rho_{AB}^B(w)=1$.

Eleventh, compute the uncertainty of each of the metrics from the previous step. The variance of each of the metrics is:

$$\sigma^2_{\rho_A^A}(w) = \frac{\rho_A^A(1-\rho_A^A)}{\pi_A^A(w) + \pi_B^A(w) + \pi_{AB}^A(w)}$$

$$\sigma^2_{\rho_B^A}(w) = \frac{\rho_B^A(1-\rho_B^A)}{\pi_A^A(w) + \pi_B^A(w) + \pi_{AB}^A(w)}$$

$$\sigma^2_{\rho_{AB}^A}(w) = \frac{\rho_{AB}^A(1-\rho_{AB}^A)}{\pi_A^A(w) + \pi_B^A(w) + \pi_{AB}^A(w)}$$

$$\sigma^2_{\rho_A^B}(w) = \frac{\rho_A^B(1-\rho_A^B)}{\pi_A^A(w) + \pi_B^A(w) + \pi_{AB}^A(w)}$$

$$\sigma^2_{\rho_B^B}(w) = \frac{\rho_B^B(1-\rho_B^B)}{\pi_A^A(w) + \pi_B^A(w) + \pi_{AB}^A(w)}$$

$$\sigma^2_{\rho_{AB}^B}(w) = \frac{\rho_{AB}^B(1-\rho_{AB}^B)}{\pi_A^A(w) + \pi_B^A(w) + \pi_{AB}^A(w)}$$

The uncertainty for each of the metrics is computed as the square root of the variance.

Twelfth, in this embodiment, $\rho_A^B(w)=\rho_B^A(w)=0$. In this case, there are two parameters that define the system. Since $\rho_A^A(w)+\rho_{AB}^A(w)=1$ and $\rho_B^B(w)+\rho_{AB}^B(w)=1$, there are only two independent parameters. Use the parameters $\rho_A^A(w)$ and $\rho_B^B(w)$ to define the system for the letter w. These parameters are on the range $0 \leq \rho_A^A(w) \leq 1$ and $0 \leq \rho_B^B(w) \leq 1$. The point $(\rho_A^A(w), \rho_B^B(w))$ represents the state of the system for the letter w. This point is on the closed space of the unit square.

The closed space of the unit square is divided into four regions. Region A is the set of points $(\rho_A^A(w), \rho_B^B(w))$ where the letter w is assigned to language A and is removed from language B. Region B is the set of points $(\rho_A^A(w), \rho_B^B(w))$ where the letter w is assigned to language B and is removed from language A. Region AB is the set of points $(\rho_A^A(w), \rho_B^B(w))$ where the letter w is assigned to both language A and language B. Region Ø is the set of points $(\rho_A^A(w), \rho_B^B(w))$ where the letter w is removed from both language A and language B.

These regions may be created using just a simple threshold. In this case, when $\rho_A^A(w) \geq \rho_{critical}$, the letter w is assigned to language A. Moreover, when $\rho_B^B(w) \geq \rho_{critical}$, the letter w is assigned to language B.

Alternatively, the regions may be created with more complicated geometries. In this case, the problem of assigning w to a language results in a multiobjective optimization problem. When language A and B are not preferred over each other, the geometry of the regions should be symmetric about the line $\rho_A^A(w)=\rho_B^B(w)$. However, when the symmetry between languages A and B is broken, the geometry of the regions may not be symmetric.

Based on the location of the point $(\rho_A^A(w), \rho_B^B(w))$, the letter w is removed from the list of rank ordered letters for language A and/or B. This step represents the evolution of the system from an initial set of rank ordered letters to a filtered set.

Thirteenth, the process is repeated from the eighth step forward for each letter w in the intersection set $I_{AB}$.

Fourteenth, the process is repeated from the sixth step forward for each pair of languages. If language A and B are treated symmetrically in the process, then the result of examining language A with B is the same as examining language B with A. In this case, we may reduce the total number of language pairs for examination. If there are N languages, examining every pair requires $N^2$ repetitions. If language A and B are treated symmetrically, then only $$\frac{N(N-1)}{2}$$

examinations are required. This count includes examining a language with itself. If this is not desired, than an additional N examinations may be removed resulting in $$\frac{N(N-3)}{2}$$

examinations.

Fifteenth, the process is repeated iteratively from the fourth step forward. Each iteration removes letters from each language. This alters the rank ordered letter list for each language. Repeating the process iteratively converges each language to a fixed list of letters assigned to the language. The final lists for each language may be written out as computer readable files.

The steps above are presented here for clarity purposes and are not intended to limit the invention. Steps may be modified, combined, run in parallel, or reordered in a variety of ways. This may be done in particular for the purpose of creating efficient algorithms.

Letter Classifier

Once a set of rank ordered common letters is identified, a letter classifier may be created by checking input text against the rank ordered common letters. The steps for using a letter classifier are detailed below.

First, each list of rank ordered common letters is identified. Preferably, these letters are read into RAM in a computer program and stored therein for fast access. In this case, each letter appears uniquely in a list, and each letter is associated with a language and a frequency of occurrence.

Second, input text for classification is provided to the classifier. The text may be a single letter or a large document. In fact, the text may be contained across multiple documents that are intended to be treated as a single document.

Third, the input text is processed with the methods used in step two and three from the Data Preparation component. By preparing the input text in with the same methods used to prepare the training data, we assure consistency of treatment which increases the likelihood that the normalized inputs are similar to the training inputs. However, some variances between the methods may be allowed to facilitate differences between the input and training sets. For example, the input set may be in a different machine readable formant and may require conversion. Alternatively, the input text may have document section markers that may be exploited to use the best text for classification. There are many reasons to treat the input text a little differently, but it is useful to create normalized input text using a method similar to that used in creating normalized training text.

Fourth, each letter in the normalized input text is presented to the list of unique letters. The languages associated with the input letter is recorded along with the frequency of occurrence for the letter in the language. Here, each language is associated with a list of letters appearing in the input text associated with the language.

Fifth, step four is repeated for each letter in the normalized input text. If a letter appears more than one time in the input text, the count of the number of appearances of the letter in the input text is recorded.

Sixth, a weight is computed for each language based on the list of letters in the text associated with the language. The weight may also incorporate a component based on the number of letters appearing in the input text that are not associated with the language. In the one embodiment, the weight is computed by multiplying the frequencies of occurrence of each letter in the document associated with the language:

$$\Phi_l = \prod_{w_i \in I \cap N_l} f_l(w_i)^{\rho_i}$$

where $\Phi_l$ is the weight associated with language l, I is the set of normalized letters from the input text, $N_l$ is the set of normalized letters associated with the language, $f_l(w_i)$ is the frequency of the letter $w_i$ in language l, and $\rho_i$ is the number of occurrences of $w_i$ in the input text.

In many cases, there are many normalized letters associated with each language. In this case, the product in the above formula contains many terms. Because $0 \le f_l(w_i) \le 1$, the resulting weight is often very small. In fact, the resulting weight may be too small to be represented by a computer using traditional variables. Because of this, it is preferred to compute the logarithm of the weight. Here, the weight is computed as $$\Phi_l = \sum_{w_i \in I \cap N_l} \rho_i \ln(f_l(w_i))$$

This representation is easier to use because the summation typically remains computable even though the product does not.

In the preferred embodiment, the weight is corrected with a factor for each letter that does not appear in a language. Let $\bar{f}_l$ be the minimum weight for any letter in language l. Let $\bar{f}$ be the minimum weight for any letter in any language. A minimum factor for each language is computed. There are many methods for computing such a factor. Let $\mu_l$ be the minimum factor for language l. Different embodiments may use different factors. Some typical factors are $$\mu_l = \bar{f}_l$$

$$\mu_l = \bar{f}_l/K$$

$$\mu_l = \bar{f}$$

$$\mu_l = \bar{f}/K$$

where K is a scaling factor and typically $K \ge 1$. Our experimentation suggest the best mode for the invention is using the last factor with K=10.

The minimum factor represents the probability that language l is not the correct language given that a letter is not associated with the language. The weight associated based on letters not associated with language l is given by $$\Psi_l = \prod_{w_i \in I - I \cap N_l} (1 - \mu_l) = (1 - \mu_l)^{|I - I \cap N_l|}$$

In logarithmic form, $$\Psi_l = \sum_{w_i \in I - I \cap N_l} \ln(1 - \mu_l) = |I - I \cap N_l| \ln(1 - \mu_l)$$

The overall weight associated with language l is given by summing these together:

$$\Omega_l = \Phi_l + \Psi_l$$

Seventh, an uncertainty is computed for the weight associated with each language. In the preferred embodiment, the weight for a language is computed as $$\Omega_l = \prod_{w_i \in I \cap N_l} f_l(w_i)^{p_i} + (1 - \mu_l)^{|I - I \cap N_l|}$$

or $$\Omega_l = \sum_{w_i \in I \cap N_l} p_i \ln(f_l(w_i)) + |I - I \cap N_l|(1 - \mu_l)$$

The associated variance is computed as $$\sigma_{\Omega_l}^2 = \frac{1}{N} \sum_{w_i \in I \cap N_l} p_i f_l(w_i)(1 - f_l(w_i)) + \frac{|I - I \cap N_l|}{N} \mu_l(1 - \mu_l)$$

or $$\sigma_{\Omega_l}^2 = \frac{1}{N} \sum_{w_i \in I \cap N_l} p_i(1 - f_l(w_i)) + \frac{|I - I \cap N_l|}{N} \mu_l$$

where N is the total number of normalized letters in the input text.

Eighth, the pairwise z-score is computed for each pair of language as $$Z_{AB} = \frac{\Omega_A - \Omega_B}{\sqrt{\sigma_{\Omega_A}^2 + \sigma_{\Omega_B}^2}}$$

Ninth, sort the weights $\Omega_l$ by decreasing weight. The highest weight is the presumptive language classification for the text. Normalize the weights according to $$\hat{\Omega}_i = \frac{\Omega_i}{\sum_{l \in L} \Omega_l}$$

where L is the set of distinct languages under consideration. The normalized weights are on the range $0 \leq \Omega_i \leq 1$.

The uncertainties may be normalized as well according to $$\sigma_{\hat{\Omega}_l}^2 = \frac{\sigma_{\Omega_l}^2}{\left[\sum_{l \in L} \Omega_l\right]^2}$$

In the preferred embodiment, the output of the classifier is the rank ordered values along with the associated variances $\vec{\sigma}_{\Omega_i}^2$.

Some embodiments desire a single language choice as the output. In this case, we may simply select the largest $\Omega_i$. Alternatively, the error analysis may be incorporated into the selection. In this case, first identify the maximum weight. Let the language associated with the maximum weight be M. Find all languages i such that $$Z_{Mi} < z_c$$

where $z_c$ is some threshold z-score. In this case we have identified all languages that are statistically the same for their weight as language M. From these, select the language that has the minimum value for $\vec{\sigma}_{\Omega_i}^2$. This represents the language that is considered statistically the best, but has the least uncertainty in the value of the weight.

The steps above are presented here for clarity purposes and are not intended to limit the invention. Steps may be modified, combined, run in parallel, or reordered in a variety of ways. This may be done in particular for the purpose of creating efficient algorithms.

In constructing the Letter Classifier, the process for Data Preparation is modified. Rather than breaking the training data into individual letters, in this case we break the training data into individual letters. The overall process for preparing the data proceeds through the same steps. However, everywhere that the original Data Preparation refers to letters, substitute letters.

Language Identification on Patterns

Language identification on patterns generalized the processes described above for letters and words. Here, patterns may be individual words, individual letters, or more complicated structures.

Data Preparation

A language classifier is often enhanced by compiling a list of patterns associated with each particular language. This section details the preparation phase for such data. This section assumes the existence of some set of machine readable documents where each document is associated with a principal language. These documents may have other language text embedded within. Alternatively, some documents may be associated with one language while the text is predominately or even entirely in another language. The process described in this section is capable of determining which patterns are associated with each language even when some of the input documents have other languages, or even when documents are incorrectly associated with one language but written entirely in another language. Based on this input, the process produces lists of common patterns for each language. These lists may be used to enhance the language classifiers described in the next sections.

The text used here is often called training text. This text is used to create or train language classifiers and is distinguished from input text that is presented to a classifier for the purpose of determining the underlying language of the text.

Zeroth, identify the patterns of interest. A pattern may be a simple as individual words or letters. In this respect, a pattern classifier generalized the aforementioned classifiers because a pattern classifier may reduce to either of these classifiers.

However, a pattern classifier allows additional flexibility. For example, a pattern may be two words in a sequence. In this case, rather than examining individual words, we examine word pairs. Alternatively, a pattern may be two letters in sequence. Again, rather than examining each letter in isolation, we examine pairs of letters.

Moreover, patterns are allowed to contain wildcard slots. For examine a letter pattern such as 'a*b' examines three letter sequences that begin with the letter 'a', contain any other letter next, then have the letter 'b'. Similarly, the word sequence 'my,*,dog' looks for three words in sequence where the first word is 'my', followed by any word, followed by the word 'dog'.

Patterns may mix word and letter sequences. For example, the pattern 'my,*,doe' contains a wildcard word for the second word, and a wildcard letter at the end of the third word. This pattern matched both 'my happy dog' and 'my large dogs'.

In this preliminary step, the pattern under examination are identified. Patterns may be specified in a particular format such as 'my,*,dog*', or in a general format such as 'w,w' where w here is meant to represent any word. The pattern 'w,w' is interpreted as examining all patterns of two words in sequence.

Alternatively, patterns may be identified in step three below based on the contents of the training documents. Here, the system discovers patterns based on examining the training documents. This may be implemented with a variety of artificial intelligence techniques such as neural networks, genetic algorithms, statistical learning, expert systems, or other artificial intelligence technique.

Handling of overlapping patterns should be addressed as well. For example, when examining word pairs, the sentence 'my dog is happy' may be interpreted as containing the two patterns 'my dog' and 'is happy'. Here, the two word patterns are not allowed to overlap. Thus, once one pattern is identified, the text associated with that pattern is not allowed to participate in another pattern. Alternatively, the sentence 'my dog is happy' may be interpreted as the three patterns 'my dog', 'dog is', and 'is happy'. Here, the two word patterns are allowed to overalp.

First, identify text documents that are associated with each language. Our initial investigations lead us to believe that 100-1000 such documents are sufficient when there are at least 10 patterns in each document. Shorter documents may be included in this set, but longer documents are preferred. If only short documents are available, we recommend 500-5000 documents.

Second, for each language, parse each document into a set or patterns. Normalize each pattern by case-folding. Simple case-folding may be implemented as making all characters lower case. However, in some languages this process is ambiguous. Another method is to first make all letter upper case, then make the result lower case. This addresses many problems encountered when using Unicode to represent the characters. The use of Unicode is highly recommended as Unicode supports a wide-variety of language scripts.

Also part of this step is the removal of punctuation. Symbols such as '.', ';', '!', '@', '#', '$', '%', '^', '*', '(',')', '{','}', '[',']', '\', ':', '?', '<', '>', '/', '"', '|', '~', '+', '−' and '`' are a few of the symbols that may be removed from the text. It should be appreciated that removal of punctuation may include other symbols than those presented here, combination of symbols may be used (where two of more symbols appear together), or some of the above symbols may be removed. In the simplest case, removing punctuation symbols may use no symbols at all in which case this part of the step is ignored.

Third, count the number of appearances of each normalized pattern. Normalize this by dividing each frequency by the total number patterns in all documents for the particular language. The normalized value is the frequency of the pattern in tat language. The sum of the frequencies of all patterns in a given language should sum to one.

Fourth, rank order the pattern list for each language from highest frequency to lowest frequency. Specify a cutoff value to truncate the pattern list. The cutoff value may be expressed as a pattern frequency, or it may be a total number of patterns. Alternatively, all patterns may be used.

Fifth, for each language, record the pairing of each rank ordered pattern (patterns surviving the cutoff) with the previous and next normalized patterns in each document. If the next or previous normalized patterns is not a rank ordered pattern, skip the occurrence. If the next normalized pattern is a rank ordered pattern, count the number of times this pattern combination appears. The pairing data for language A is represented as $P_A(w)$ while the pairing data for language B is represented as $P_B(w)$. This notation means that given a particular pattern w, $P_A(W)$ is the list of rank ordered patterns that are paired with w. This may also include the frequency count of the pairing as well.

Sixth, for each pair of languages, create the union set of the rank ordered pattern lists for both the languages. The union set is the set of unique patterns that appear in either set. Thus, if one set has patterns A and B, and the other set has patterns B and C, the union set is A, B, and C. Note that B appears only once in the union set because the union set is a set of unique patterns.

Let $R_A$ and $R_B$ be the rank ordered pattern lists of the two languages. The union set is expressed as $U_{AB}=R_A \cup R_B$.

Seventh, identify the intersection of patterns between the languages. The intersection is the set of unique patterns that appear in both languages. Thus, if one set has patterns A and B, and the other set has patterns B and C, the intersection set is A and C.

Let $R_A$ and $R_B$ be the rank ordered pattern lists of the two languages. The intersection set is expressed as $I_{AB}=R_A \cap R_B$.

Eighth, identify the patterns that are exclusive to each language in the language pair. These are the patterns that appear on the rank ordered pattern list for one language but not the other. The exclusive pattern list for each language may be computed from the previous results. The exclusive patterns for language A are $E_A=R_A-I_{AB}$. The exclusive patterns for language B are $E_B=R_B-I_{AB}$.

Ninth, examine each of the rank ordered patterns that are common to the two languages. This is the intersection $I_{AB}$. For each rank ordered pattern w, examine the list of pattern pairings for each language ($P_A(w)$ and $P_B(w)$). For each paired pattern in $P_A(w)$, determine if the pattern is exclusive to A, B, or is on both lists. Mathematically, let $P_A^i(w)$ be the $i^{th}$ rank ordered pattern paired with w for language A. Since the sets $E_A$, $E_B$, and $I_{AB}$ are mutually exclusive ($I_{AB} \cap E_A=0$, $I_{AB} \cap E_B=0$, and $E_B \cap E_A=0$), then exactly one of three choices must be true: $P_A^i(w) \in E_A$, $P_A^i(w) \in E_B$, or $P_A^i(w) \in I_{AB}$.

For a given rank ordered pattern w, we count the number of paired patterns that are exclusive to A ($P_A^i(w) \in E_A$), the number of paired patterns that are exclusive to B A ($P_A^i(w) \in E_B$), and the number of paired patterns that are on both lists A and B ($P_A^i(w) \in I_{AB}$). Represent the number of paired patterns for pattern w from language A that are exclusive to A be represented as $\pi_A^A(w)$. The number of paired patterns for pattern w from language A that are exclusive to B be represented as $\pi_B{}^A(w)$. Finally, let the number of paired patterns for pattern w from language A that are in both A and B be represented as $\pi_{AB}{}^A(w)$. Optionally, these counts may be weighted by the frequency of each rank ordered pattern pair, the frequency of the paired pattern, or the frequency of w. Note, in this embodiment, the quantity $\pi_B{}^A(w)=0$, but alternative embodiments may have this nonzero.

This process is repeated using the paired patterns from list B. Similar to above, for a given rank ordered pattern w, we count the number of paired patterns that are exclusive to A ($P_B{}^i(w) \in E_A$), the number of paired patterns that are exclusive to B A ($P_B{}^i(w) \in E_B$), and the number of paired patterns that are on both lists A and B ($P_B{}^i(w) \in I_{AB}$). Represent the number of paired patterns for pattern w from language B that are exclusive to A be represented as $\pi_A{}^B(w)$. The number of paired patterns for pattern w from language B that are exclusive to B be represented as $\pi_B{}^B(w)$. Finally, let the number of paired patterns for pattern w from language A that are in both A and B be represented as $\pi_{AB}{}^B(w)$. Optionally, these counts may be weighted by the frequency of each rank ordered pattern pair, the frequency of the paired pattern, or the frequency of w. Note, in this embodiment, the quantity $\pi_A{}^B(w)=0$, but alternative embodiments may have this nonzero.

Tenth, compute a weight for allocating w to either language A, language B, or both A and B as follows. The preference of allocating w to language A based on the text assigned to language A is computed as $$\rho_A^A(w) = \frac{\pi_A^A(w)}{\pi_A^A(w) + \pi_B^A(w) + \pi_{AB}^A(w)}$$

The preference of allocating w to language B based on the text assigned to language A is computed as $$\rho_B^A(w) = \frac{\pi_B^A(w)}{\pi_A^A(w) + \pi_B^A(w) + \pi_{AB}^A(w)}$$

The preference of allocating w to both language A and B based on the text assigned to language A is computed as $$\rho_{AB}^A(w) = \frac{\pi_{AB}^A(w)}{\pi_A^A(w) + \pi_B^A(w) + \pi_{AB}^A(w)}$$

In these equations, $\rho_A{}^A(w)+\rho_B{}^A(w)=1$.

The preference of allocating w to language A based on the text assigned to language B is computed as $$\rho_A^B(w) = \frac{\pi_A^B(w)}{\pi_A^B(w) + \pi_B^B(w) + \pi_{AB}^B(w)}$$

The preference of allocating w to language B based on the text assigned to language B is computed as $$\rho_B^B(w) = \frac{\pi_B^B(w)}{\pi_A^B(w) + \pi_B^B(w) + \pi_{AB}^B(w)}$$

The preference of allocating w to both language A and B based on the text assigned to language B is computed as $$\rho_{AB}^B(w) = \frac{\pi_{AB}^B(w)}{\pi_A^B(w) + \pi_B^B(w) + \pi_{AB}^B(w)}$$

In these equations, $\rho_A{}^B(w)+\rho_B{}^B(w)+\rho_{AB}{}^B(w)=1$.

Eleventh, compute the uncertainty of each of the metrics from the previous step. The variance of each of the metrics is:

$$\sigma^2_{\rho_A^A}(w) = \frac{\rho_A^A(1-\rho_A^A)}{\pi_A^A(w) + \pi_B^A(w) + \pi_{AB}^A(w)}$$

$$\sigma^2_{\rho_B^A}(w) = \frac{\rho_B^A(1-\rho_B^A)}{\pi_A^A(w) + \pi_B^A(w) + \pi_{AB}^A(w)}$$

$$\sigma^2_{\rho_{AB}^A}(w) = \frac{\rho_{AB}^A(1-\rho_{AB}^A)}{\pi_A^A(w) + \pi_B^A(w) + \pi_{AB}^A(w)}$$

$$\sigma^2_{\rho_A^B}(w) = \frac{\rho_A^B(1-\rho_A^B)}{\pi_A^A(w) + \pi_B^A(w) + \pi_{AB}^A(w)}$$

$$\sigma^2_{\rho_B^B}(w) = \frac{\rho_B^B(1-\rho_B^B)}{\pi_A^A(w) + \pi_B^A(w) + \pi_{AB}^A(w)}$$

$$\sigma^2_{\rho_{AB}^B}(w) = \frac{\rho_{AB}^B(1-\rho_{AB}^B)}{\pi_A^A(w) + \pi_B^A(w) + \pi_{AB}^A(w)}$$

The uncertainty for each of the metrics is computed as the square root of the variance.

Twelfth, in this embodiment, $\rho_A{}^B(w)=\rho_B{}^A(w)=0$. In this case, there are two parameters that define the system. Since $\rho_A{}^A(w)=\rho_{AB}{}^A(w)=1$ and $\rho_B{}^B(w)=\rho_{AB}{}^A(w)=1$, there are only two independent parameters. Use the parameters $\rho_A{}^A(w)$ and $\rho_B{}^A(w)$ to define the system for the pattern w. These parameters are on the range $0 \leq \rho_A{}^A(w) \leq 1$ and $0 \leq \rho_B{}^B(w) \leq 1$. The point $(\rho_A{}^A(w),\rho_B{}^B(w))$ represents the state of the system for the pattern w. This point is on the closed space of the unit square.

The closed space of the unit square is divided into four regions. Region A is the set of points $(\rho_A{}^A(w),\rho_B{}^B(w))$ where the pattern w is assigned to language A and is removed from language B. Region B is the set of points $(\rho_A{}^A(w),\rho_B{}^B(w))$ where the pattern w is assigned to language B and is removed from language A. Region AB is the set of points $(\rho_A{}^A(w),\rho_B{}^B(w))$ where the pattern w is assigned to both language A and language B. Region Ø is the set of points $(\rho_A{}^A(w),\rho_B{}^B(w))$ where the pattern w is removed from both language A and language B.

These regions may be created using just a simple threshold. In this case, when $\rho_A{}^A(w) \geq \rho_{critical}$, the pattern w is assigned to language A. Moreover, when $\rho_B{}^B(w) \geq \rho_{critical}$, the pattern w is assigned to language B.

Alternatively, the regions may be created with more complicated geometries. In this case, the problem of assigning w to a language results in a multiobjective optimization problem. When language A and B are not preferred over each other, the geometry of the regions should be symmetric about the line $\rho_A{}^A(w)=\rho_B{}^B(w)$. However, when the symmetry between languages A and B is broken, the geometry of the regions may not be symmetric.

Based on the location of the point $(\rho_A{}^A(w),\rho_B{}^B(w))$, the pattern w is removed from the list of rank ordered patterns for language A and/or B. This step represents the evolution of the system from an initial set of rank ordered patterns to a filtered set.

Thirteenth, the process is repeated from the eighth step forward for each pattern w in the intersection set $I_{AB}$.

Fourteenth, the process is repeated from the sixth step forward for each pair of languages. If language A and B are treated symmetrically in the process, then the result of examining language A with B is the same as examining language B with A. In this case, we may reduce the total number of language pairs for examination. If there are N languages, examining every pair requires $N^2$ repetitions. If language A and B are treated symmetrically, then only $$\frac{N(N-1)}{2}$$

examinations are required. This count includes examining a language with itself. If this is not desired, than an additional N examinations may be removed resulting in $$\frac{N(N-3)}{2}$$

examinations.

Fifteenth, the process is repeated iteratively from the fourth step forward. Each iteration removes patterns from each language. This alters the rank ordered pattern list for each language. Repeating the process iteratively converges each language to a fixed list of patterns assigned to the language. The final lists for each language may be written out as computer readable files.

The steps above are presented here for clarity purposes and are not intended to limit the invention. Steps may be modified, combined, run in parallel, or reordered in a variety of ways. This may be done in particular for the purpose of creating efficient algorithms.

Pattern Classifier

Once a set of rank ordered common patterns is identified, a pattern classifier may be created by checking input text against the rank ordered common patterns. The steps for using a pattern classifier are detailed below.

First, each list of rank ordered common patterns is identified. Preferably, these patterns are read into RAM in a computer program and stored therein for fast access. In this case, each pattern appears uniquely in a list, and each pattern is associated with a language and a frequency of occurrence.

Second, input text for classification is provided to the classifier. The text may be a single pattern or a large document. In fact, the text may be contained across multiple documents that are intended to be treated as a single document.

Third, the input text is processed with the methods used in step two and three from the Data Preparation component. By preparing the input text in with the same methods used to prepare the training data, we assure consistency of treatment which increases the likelihood that the normalized inputs are similar to the training inputs. However, some variances between the methods may be allowed to facilitate differences between the input and training sets. For example, the input set may be in a different machine readable formant and may require conversion. Alternatively, the input text may have document section markers that may be exploited to use the best text for classification. There are many reasons to treat the input text a little differently, but it is useful to create normalized input text using a method similar to that used in creating normalized training text.

Fourth, each pattern in the normalized input text is presented to the list of unique patterns. The languages associated with the input pattern is recorded along with the frequency of occurrence for the pattern in the language. Here, each language is associated with a list of patterns appearing in the input text associated with the language.

Fifth, step four is repeated for each pattern in the normalized input text. If a pattern appears more than one time in the input text, the count of the number of appearances of the pattern in the input text is recorded.

Sixth, a weight is computed for each language based on the list of patterns in the text associated with the language. The weight may also incorporate a component based on the number of patterns appearing in the input text that are not associated with the language. In the one embodiment, the weight is computed by multiplying the frequencies of occurrence of each pattern in the document associated with the language:

$$\Phi_l \prod_{w_i \in I \cap N_l} f_l(w_i)^{\rho_i}$$

where $\Phi$ is the weight associated with language l, I is the set of normalized patterns from the input text, $N_l$ is the set of normalized patterns associated with the language, $f_l(w_i)$ is the frequency of the pattern $w_i$ in language l, and $\rho_i$ is the number of occurrences of $w_i$ in the input text.

In many cases, there are many normalized patterns associated with each language. In this case, the product in the above formula contains many terms. Because $0 \leq f_l(w_i) \leq 1$, the resulting weight is often very small. In fact, the resulting weight may be too small to be represented by a computer using traditional variables. Because of this, it is preferred to compute the logarithm of the weight. Here, the weight is computed as $$\Phi_l = \sum_{w_i \in I \cap N_l} \rho_i \ln(f_l(w_i))$$

This representation is easier to use because the summation typically remains computable even though the product does not.

In the preferred embodiment, the weight is corrected with a factor for each pattern that does not appear in a language. Let $\bar{f}_l$ be the minimum weight for any pattern in language l. Let $\bar{f}$ be the minimum weight for any pattern in any language. A minimum factor for each language is computed. There are many methods for computing such a factor. Let $\mu_l$ be the minimum factor for language l. Different embodiments may use different factors. Some typical factors are $$\mu_l = \bar{f}_l$$

$$\mu_l = \bar{f}_l / K$$

$$\mu_l = \bar{f}$$

$$\mu_l = \bar{f} / K$$

where K is a scaling factor and typically $K \geq 1$. Our experimentation suggest the best mode for the invention is using the last factor with K=10.

The minimum factor represents the probability that language l is not the correct language given that a pattern is not associated with the language. The weight associated based on patterns not associated with language l is given by $$\Psi_l \prod_{w_i \in I - I \cap N_l} (1 - \mu_l) = (1 - \mu_l)^{|I - I \cap N_l|}$$

In logarithmic form, $$\Psi_l \sum_{w_i \in I - I \cap N_l} \ln(1 - \mu_l) = |I - I \cap N_l| \ln(1 - \mu_l)$$

The overall weight associated with language l is given by summing these together:

$$\Omega_l = \Phi_l + \Psi_l$$

Seventh, an uncertainty is computed for the weight associated with each language. In the preferred embodiment, the weight for a language is computed as $$\Omega_l \prod_{w_i \in I \cap N_l} f_l(w_i)^{\rho_i} + (1 - \mu_l)^{|I - I \cap N_l|}$$

or $$\Omega_l = \sum_{w_i \in I \cap N_l} \rho_i \ln(f_l(w_i)) + |I - I \cap N_l|(1 - \mu_l)$$

The associated variance is computed as $$\sigma_{\Omega_l}^2 = \frac{1}{N} \sum_{w_i \in I \cap N_l} \rho_i f_l(w_i)(1 - f_l(w_i)) + \frac{|I - I \cap N_l|}{N} \mu_l(1 - \mu_l)$$

or $$\sigma_{\Omega_l}^2 = \frac{1}{N} \sum_{w_i \in I \cap N_l} \rho_i (1 - f_l(w_i)) + \frac{|I - I \cap N_l|}{N} \mu_l$$

where N is the total number of normalized patterns in the input text.

Eighth, the pairwise z-score is computed for each pair of language as $$Z_{AB} = \frac{\Omega_A - \Omega_B}{\sqrt{\sigma_{\Omega_A}^2 + \sigma_{\Omega_B}^2}}$$

Ninth, sort the weights $\Omega_l$ by decreasing weight. The highest weight is the presumptive language classification for the text. Normalize the weights according to $$\hat{\Omega}_i = \frac{\Omega_i}{\sum_{l \in L} \Omega_l}$$

where L is the set of distinct languages under consideration. The normalized weights are on the range $0 \leq \Omega_i \leq 1$.

The uncertainties may be normalized as well according to $$\hat{\sigma}_{\Omega_l}^2 = \frac{\sigma_{\Omega_l}^2}{\left[\sum_{l \in L} \Omega_l\right]^2}$$

In the preferred embodiment, the output of the classifier is the rank ordered values $\vec{\Omega}$ along with the associated variances $\vec{\sigma}_{\Omega_l}^2$.

Some embodiments desire a single language choice as the output. In this case, we may simply select the largest $\Omega_l$. Alternatively, the error analysis may be incorporated into the selection. In this case, first identify the maximum weight. Let the language associated with the maximum weight be M. Find all languages i such that $$Z_{Mi} < z_c$$

where $z_c$ is some threshold z-score. In this case we have identified all languages that are statistically the same for their weight as language M. From these, select the language that has the minimum value for $\vec{\sigma}_{\Omega_l}^2$. This represents the language that is considered statistically the best, but has the least uncertainty in the value of the weight.

The steps above are presented here for clarity purposes and are not intended to limit the invention. Steps may be modified, combined, run in parallel, or reordered in a variety of ways. This may be done in particular for the purpose of creating efficient algorithms.

Language Identification on Classifier Combinations

The performance of language identification on text may be enhanced by using multiple classifiers to classify the text, then combining the results into a single set of outputs. In the previous section we showed that the Pattern Classifier generalizes both the word and letter classifier in the sense that a Pattern Classifier may reduce to a Word Classifier or Letter Classifier when the patterns take particular forms.

In this section we assume that a set of n Pattern Classifiers are used, and the output for the $i^{th}$ Pattern Classifier has normalized weights $\hat{\Omega}_{il}$ and normalized variances $\hat{\sigma}_{il}^2$ where l is associated with a particular language. Both and $\hat{\Omega}_{il}$ and $\hat{\sigma}_{il}^2$ are matrices where one index runs over the n Pattern Classifiers and the other index runs over the available languages.

Combination Classifier

First, input text is identified for language classification. The input text is presented to each of the Pattern Classifiers and the results for each are obtained. This provides the raw data $\hat{\Omega}_{il}$ and $\hat{\sigma}_{il}^2$ required for the Combination Classifier.

Second, a weight may be associated with each classifier pertaining to the confidence the classifier has in its results. Let $p_i$ be the weight associated with the $i^{th}$ Pattern Classifier.

Preferably, this weight is based on the content of the input text under consideration in light of testing performed on each Pattern Classifier. For example, experience may lead us to believe that a Letter Classifier is always about 95% accurate. Alternatively, we may find that a word classifier is 50% accurate with the input text has less than 10 words, 75% accurate when the input text has between 10 and 50 words, and 99% accurate when the input text has 100 words or more. These general accuracy measurements may be used as weights for the respective classifiers.

Incorporating experienced based weighting for the Pattern Classifiers helps to improve the overall performance of the Combination Classifier. In this respect, the results of a Pattern Classifier that is known to perform well in a certain situation may be weighted higher than a Pattern Classifier that is known to perform poorer under the circumstances. Moreover, the weights may be adjusted over time based on feedback to the system. This allows the Combination Classifier to learn from experience and improve its performance over time without needing to add additional Pattern Classifiers or modify the existing Pattern Classifiers.

Alternatively, we may choose $p_i=p_j$ for every i and j. This choice effectively ignores the weight in the following steps.

Third, compute a combination weight for each language as follows:

$$\mathfrak{W}_l = \frac{p_l}{N} \sum_{i=1}^{N} \hat{\Omega}_{il}$$

Fourth, compute a combination variance for each language as follows:

$$\sigma_l^2 = \frac{p_l^2}{N} \sum_{i=1}^{N} \hat{\sigma}_{il}^2$$

Fifth, identify the language with the maximum value for $\mathfrak{W}_{Max}$. This is the presumptive language choice for the input text.

Sixth, identify all languages where $$Z_{MB} = \frac{\mathfrak{W}_{Max} - \mathfrak{W}_B}{\sqrt{\sigma_{Max}^2 + \sigma_B^2}} < Z_C$$

where $Z_c$ is a critical z-score threshold value that determines when two combination weights are considered statistically different.

Seventh, from the list of languages considered statistically similar to $\mathfrak{W}_{Max}$, select the language where $\sigma_l^2$ has the minimum value.

Extensions

The above embodiments are presented using statistical analysis often referred to as frequentist statistics. It should be appreciated that these results may be extended to incorporate Bayesian statistics as well.

It should be apparent from the foregoing that an invention having significant advantages has been provided. While the invention is shown in only a few of its forms, it is not just limited to the embodiments shown, but is susceptible to various changes and modifications without departing from the spirit thereof.

Examples and Drawings

The aforementioned Language, Letter, and Pattern Classifiers may best be understood through means of examples of preferred embodiments.

FIG. 1 shows a flowchart for the process of Data Preparation for the Word Classifier. The process begins by identifying the training documents to use with Data Preparation. Each document is preprocessed to remove undesired characters, case folded, and parsed into words. The number of occurrences of each word is counted. The total number of words is computed, and each count is divided by the total number of words to compute the frequency of occurrence of each word. The list of words are arranged according to their frequency, and optionally, a cutoff is applied. This results in a list of the most common words for the language. Then each document is examined to identify the location of each word on the common word list, and the immediate predecessor or successor word is identified. If the predecessor/successor is also on the list of common words, a count is increments for the word pair. This process is repeated for each language resulting in a common word and common pair list for each language.

Once this is completed, each pair of languages is processed by identifying the common words in both languages. Based on this, the words that are unique to each language are identified, as well as the words that are common to both languages. For each word that is common to both languages, the language allocation weights are computed. The pairings of the word is examined in each language respectively. All words that are paired with this word are identified. For the words paired to this word, a count is made of the number of paired words that are exclusive to the language vs the number of paired words that are in common to both languages. Once the language weight allocations are computed, the variances of the language weight allocations are computed. A determination to assign the word to each language is made using geometry in the allocation space. Based on this, the word may be assigned to one of the languages, both, or neither.

This is repeated for each word common to both languages. Then the process is repeated for each pair of languages. Finally, the entire process may be repeated iteratively to achieve convergence of the common word lists for each language. The Data Preparation process results in creating common words files for each language under consideration.

Figure 2:
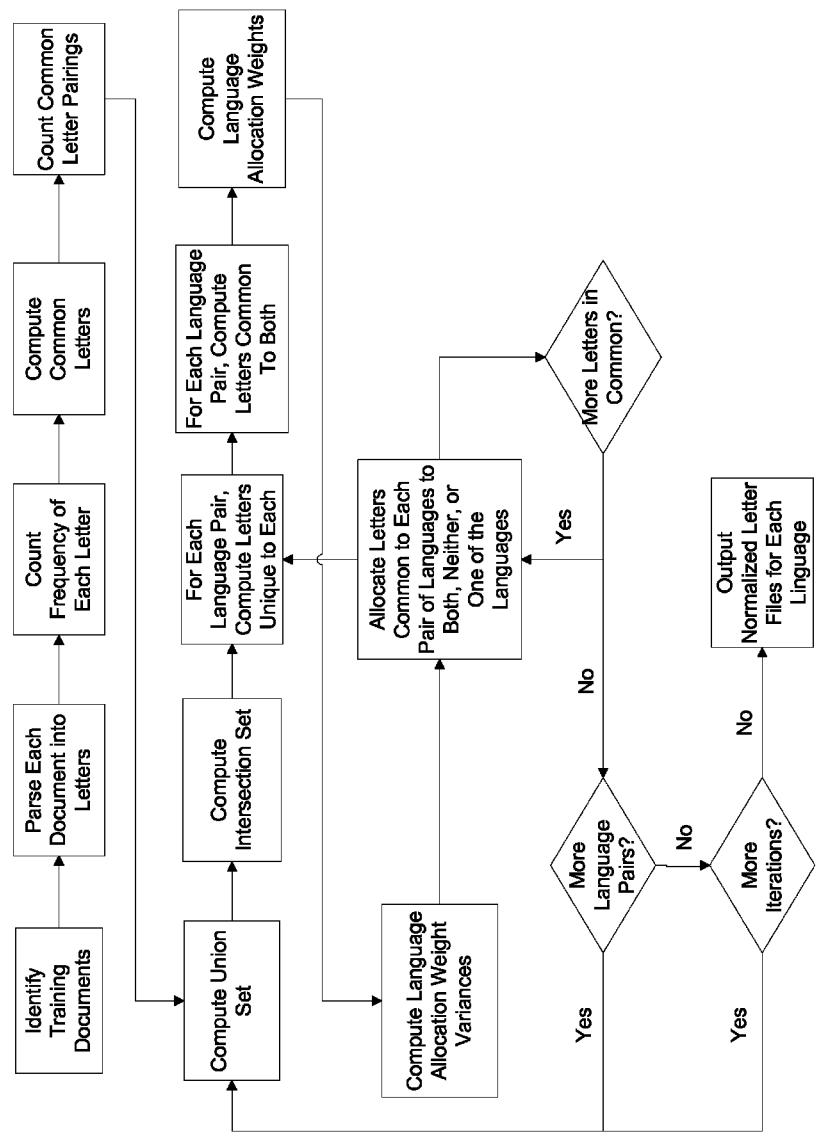
FIG. 2 is an illustration of the process for Data Preparation for the Letter Classifier.

FIG. 2 shows a flowchart for the process of Data Preparation for the Letter Classifier. The process begins by identifying the training documents to use with Data Preparation. Each document is preprocessed to remove undesired characters, case folded, and parsed into letters. The number of occurrences of each letter is counted. The total number of letters is computed, and each count is divided by the total number of letters to compute the frequency of occurrence of each letter. The list of letters are arranged according to their frequency, and optionally, a cutoff is applied. This results in a list of the most common letters for the language. Then each document is examined to identify the location of each letter on the common letter list, and the immediate predecessor or successor letter is identified. If the predecessor/successor is also on the list of common letters, a count is increments for the letter pair. This process is repeated for each language resulting in a common letter and common pair list for each language.

Once this is completed, each pair of languages is processed by identifying the common letters in both languages. Based on this, the letters that are unique to each language are identified, as well as the letters that are common to both languages. For each letter that is common to both languages, the language allocation weights are computed. The pairings of the letter is examined in each language respectively. All letters that are paired with this letter are identified. For the letters paired to this letter, a count is made of the number of paired letters that are exclusive to the language vs the number of paired letters that are in common to both languages. Once the language weight allocations are computed, the variances of the language weight allocations are computed. A determination to assign the letter to each language is made using geometry in the allocation space. Based on this, the letter may be assigned to one of the languages, both, or neither.

This is repeated for each letter common to both languages. Then the process is repeated for each pair of languages. Finally, the entire process may be repeated iteratively to achieve convergence of the common letter lists for each language. The Data Preparation process results in creating common letters files for each language under consideration.

Figure 3:
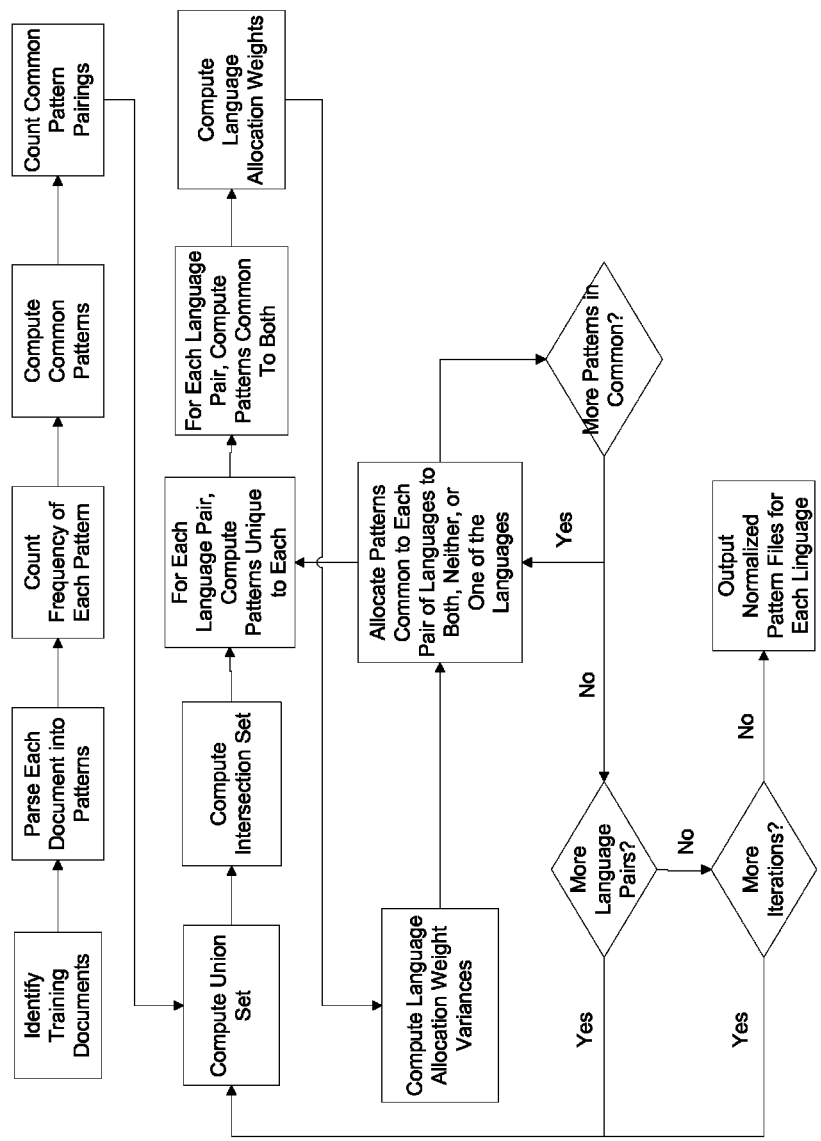
FIG. 3 is an illustration of the process for Data Preparation for the Pattern Classifier.

FIG. 3 shows a flowchart for the process of Data Preparation for the Pattern Classifier. The process begins by identifying the training documents to use with Data Preparation. Each document is preprocessed to remove undesired characters, case folded, and parsed into patterns. The number of occurrences of each pattern is counted. The total number of patterns is computed, and each count is divided by the total number of patterns to compute the frequency of occurrence of each pattern. The list of patterns are arranged according to their frequency, and optionally, a cutoff is applied. This results in a list of the most common patterns for the language. Then each document is examined to identify the location of each pattern on the common pattern list, and the immediate predecessor or successor pattern is identified. If the predecessor/successor is also on the list of common patterns, a count is increments for the pattern pair. This process is repeated for each language resulting in a common pattern and common pair list for each language.

Once this is completed, each pair of languages is processed by identifying the common patterns in both languages. Based on this, the patterns that are unique to each language are identified, as well as the patterns that are common to both languages. For each pattern that is common to both languages, the language allocation weights are computed. The pairings of the pattern is examined in each language respectively. All patterns that are paired with this pattern are identified. For the patterns paired to this pattern, a count is made of the number of paired patterns that are exclusive to the language vs the number of paired patterns that are in common to both languages. Once the language weight allocations are computed, the variances of the language weight allocations are computed. A determination to assign the pattern to each language is made using geometry in the allocation space. Based on this, the pattern may be assigned to one of the languages, both, or neither.

This is repeated for each pattern common to both languages. Then the process is repeated for each pair of languages. Finally, the entire process may be repeated iteratively to achieve convergence of the common pattern lists for each language. The Data Preparation process results in creating common patterns files for each language under consideration.

Figure 4:
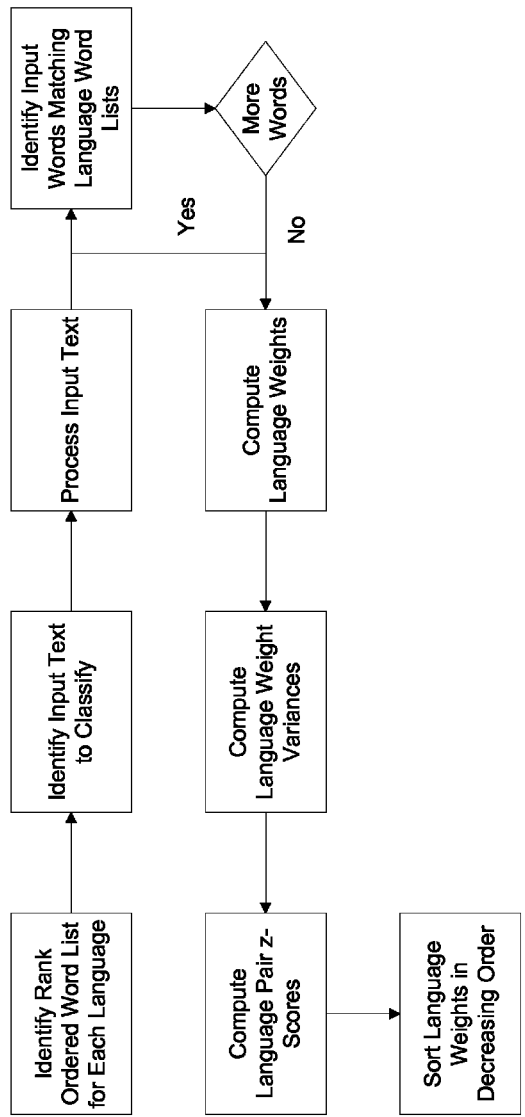
FIG. 4 is an illustration of the process for classifying text with the Word Classifier.

FIG. 4 shows the process of applying the Word Classifier to input text. First, the list of common words from the Word Classifier Data Preparation phase is rank ordered according to frequency. Then a target input text is identified for analysis. The input text is processed similar to the processing of the training documents for the Word Classifier Data Preparation phase. Each normalized word in the input text is compared to the list of common words for the Word Classifier. From this, a weight is computed for each language under consideration. In addition, the variances of the weights are also computed. The maximum language weight is identified. Next, the z-score is computed for each pair between the maximum language and each other language under consideration. All languages that are statistically similar to the maximum are identified. Among this set of languages, the language with the smallest weight variance is selected.

Figure 5:
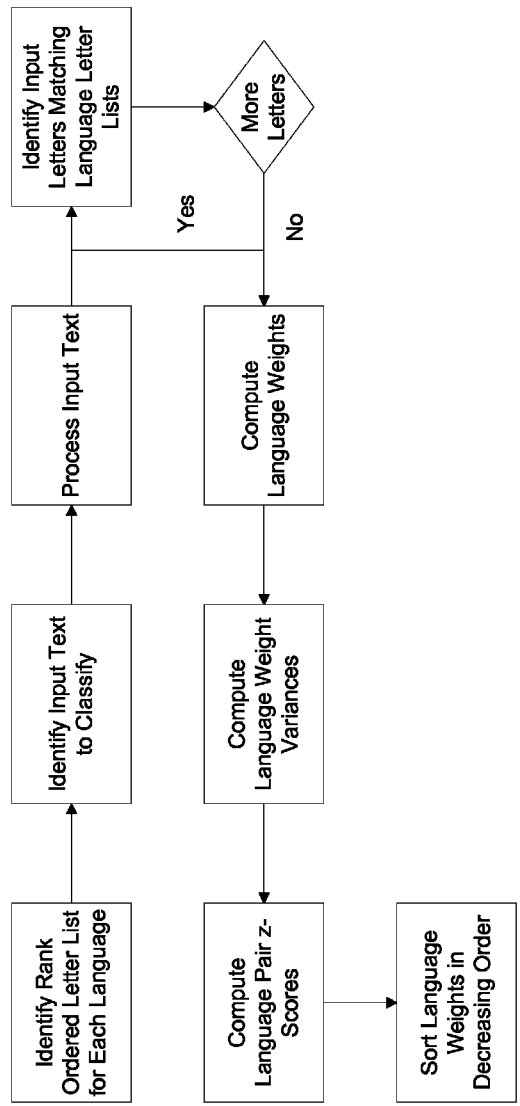
FIG. 5 is an illustration of the process for classifying text with the Letter Classifier.

FIG. 5 shows the process of applying the Letter Classifier to input text. First, the list of common letters from the Letter Classifier Data Preparation phase is rank ordered according to frequency. Then a target input text is identified for analysis. The input text is processed similar to the processing of the training documents for the Letter Classifier Data Preparation phase. Each normalized letter in the input text is compared to the list of common letters for the Letter Classifier. From this, a weight is computed for each language under consideration. In addition, the variances of the weights are also computed. The maximum language weight is identified. Next, the z-score is computed for each pair between the maximum language and each other language under consideration. All languages that are statistically similar to the maximum are identified. Among this set of languages, the language with the smallest weight variance is selected.

Figure 6:
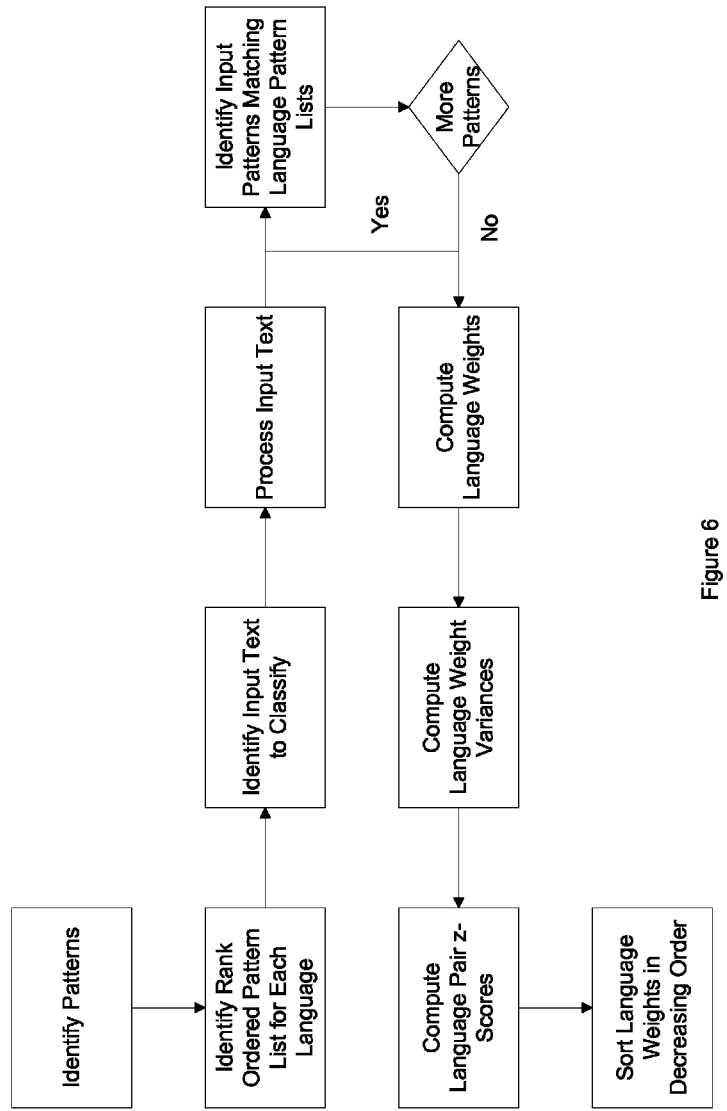
FIG. 6 is an illustration of the process for classifying text with the Pattern Classifier.

FIG. 6 shows the process of applying the Pattern Classifier to input text. First, the list of common patterns from the Pattern Classifier Data Preparation phase is rank ordered according to frequency. Then a target input text is identified for analysis. The input text is processed similar to the processing of the training documents for the Pattern Classifier Data Preparation phase. Each normalized pattern in the input text is compared to the list of common patterns for the Pattern Classifier. From this, a weight is computed for each language under consideration. In addition, the variances of the weights are also computed. The maximum language weight is identified. Next, the z-score is computed for each pair between the maximum language and each other language under consideration. All languages that are statistically similar to the maximum are identified. Among this set of languages, the language with the smallest weight variance is selected.

Figure 7:
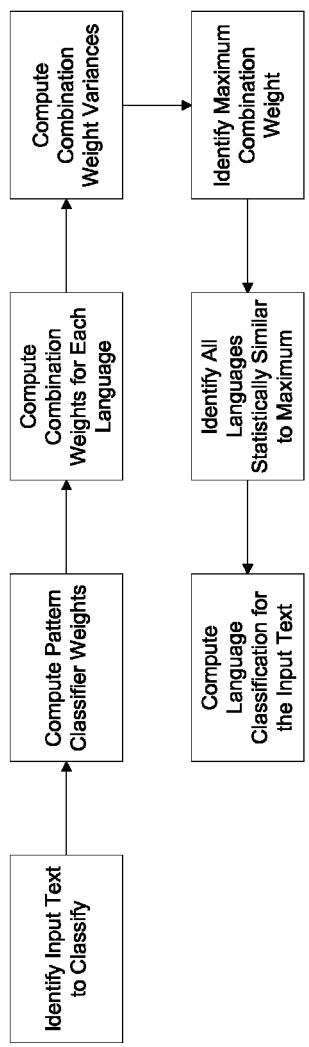
FIG. 7 is an illustration of the process for classifying text with the Combination Classifier.

FIG. 7 shows the process of applying the Combination Classifier to a plurality of Pattern Classifiers. Input text is identified for classification. This text is presented to each of the Pattern Classifiers. A Pattern Classifier weight is computed based on the input text under consideration. With this and the output of each classifier, a combination weight is computed for each language. The variance of each of these combination weights is also computed. The maximum combination weight is identified, along with all combination weights that are statistically similar to the maximum. From this set of languages, the language with the smallest combination weight variance is selected.

FIG. 8 illustrates a simple example of processing two languages. Here, the languages have patterns such as words, letters, and word pairs. The count of occurrence of each pattern is tallied for each language. From this, a frequency for each pattern is computed by dividing the respective count by the total number of counts. Furthermore, the patterns that are exclusive to each language are determined, along with the patterns that are common to both languages.

FIG. 9 shows tables that may result from examining the patterns common to both languages form FIG. 8. Here, when examining training documents that are presumptively English, the term 'jacob' appears paired with 1500 different patterns that are exclusively English, and 3000 different patterns that are common to both English and Spanish. Similarly, when examining training documents that are presumptively Spanish, the term 'jacob' appears paired with 500 different terms that are exclusively Spanish, and 100 terms that are common to both English and Spanish. Similar results are shown for the term 'a'. From this, the relative frequency for the English and Spanish terms is computed by dividing the results for each language by the total number of paired words.

Figure 10:
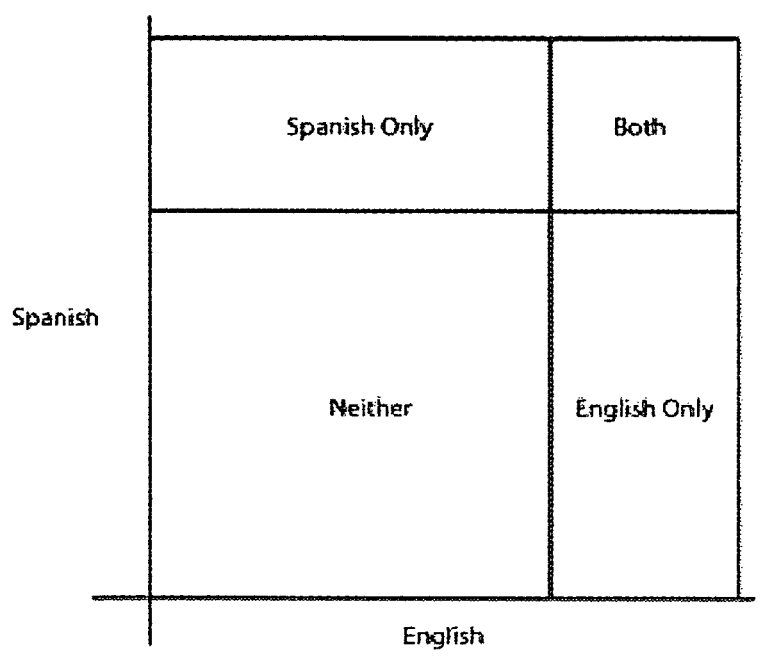

FIG. 10 shows a diagram of a simple threshold geometry for the allocation of a term to a language. For each word, the relative frequency in each language is computed and plotted as a point in this figure. If the point lies in the 'Spanish Only' region, the term is left on the list for common words in Spanish, but removed from the list of common words in English. Alternatively, if the point lies in the 'English Only' region, the term is left on the list for common words in English, but removed from the list of common words in Spanish. If the point lies in the 'Both' region, the term is left on the list for common words for both English and Spanish. Finally, if the term list in the 'Neither' region, the term is removed from the list of common words for both English and Spanish.

Figure 11:
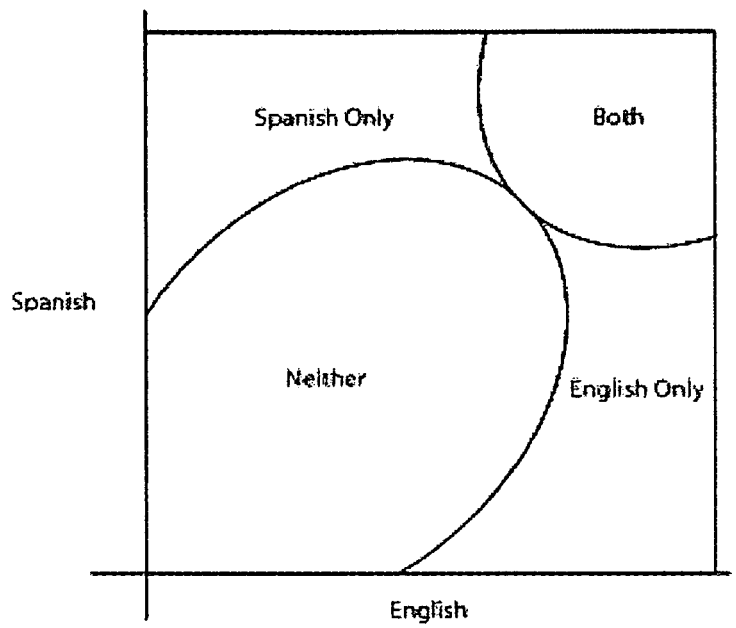
FIG. 11 is an illustration of a more general geometry for determining the association of a common patter with either one language, both, or neither.

FIG. 11 shows a diagram of a more complicated geometry for the allocation of a term to a language. For each word, the relative frequency in each language is computed and plotted as a point in this figure. If the point lies in the 'Spanish Only' region, the term is left on the list for common words in Spanish, but removed from the list of common words in English. Alternatively, if the point lies in the 'English Only' region, the term is left on the list for common words in English, but removed from the list of common words in Spanish. If the point lies in the 'Both' region, the term is left on the list for common words for both English and Spanish. Finally, if the term list in the 'Neither' region, the term is removed from the list of common words for both English and Spanish.

What is claimed is:

1. A computer containing a software program for identifying the language of text, wherein the software program comprises:
   One or more processors;
   A Combination Classifier comprising a plurality of Pattern Classifiers containing at least one Word Classifier and at least one Letter Classifier;
   Identifying input text for language classification;
   Presenting the input text to the Combination Classifier;
   Where the Combination Classifier presents the input text to each of the Pattern Classifiers;
   Where each of the Pattern Classifiers produces: a vector of weights where each component of the vector is the weight associated with a particular language; and a vector of variances where each component of the vector is the variance of the weight associated with a particular language;
   Where each Pattern Classifier is associated with a weight wherein at least one weight is different from at least one other weight;
   Where the Combination Classifier computes a combination weight vector based on the weight vectors produced from the plurality of Pattern Classifier weight vectors;
   Where the Combination Classifier computes a combination weight variance vector based on the weight variance vectors produced by the plurality of Pattern Classifier weight variance vectors; and
   Where the Combination Classifier computes a rank ordered list of languages to associate with the input text based on the combination weight vector and the combination weight variance vector.

2. A method for Data Preparation comprising:
   Identifying a set of training documents wherein each training document is associated with at least one language;
   Preprocessing each training document comprising:
   Case-folding the text of the document;
   Removing punctuation symbols from the document; and
   Parsing the document according to a pattern where the pattern is chosen from the group: words, letters, word pairs, or letter pairs,
   Counting the number of occurrences of each pattern in all documents associated with a particular language;
   Computing the frequency of occurrence of each pattern in each language by dividing the count of the pattern in a language by the total number of patterns matched to the language across all documents associated with the language;
   Identifying a list of common patterns by applying a threshold to the list of patterns associate with each language;
   Processing each document as a sequential list of patterns encountered and associating each pattern with a previous and next pattern;
   Counting the number of occurrences of pairings of each common pattern for each language with the previous or next pattern;
   Examining each pair of languages language by:
      Computing the union set of common words between the languages;
      Computing the intersection set of common words between the languages;
      Identifying the patterns that are unique to each language;
      Identifying the patterns that are common to each language;
   Examining each of the patterns common to each language by:
      Identifying the number of patterns paired to the pattern under examination associated with the first language in the language pair;
      Counting the number of patterns pairs to the pattern from the first language that are exclusive to the first language;
   Counting the number of pattern pairs to the pattern from the first language that are common to both languages to yield a first count number;
   Computing a set of first weights of pattern pairs for the first language by dividing the first count number by the total number of pattern pairs from the first language;
   Counting the number of patterns pairs to the pattern from the second language that are exclusive to the second language;
   Counting the number of pattern pairs to the pattern from the second language that are common to second languages to yield a second count number;
   Computing a set of second weights of pattern pairs for the second language by dividing the second count number by the total number of pattern pairs from the second language;
   Computing the variance of each of the first weights;
   Computing the variance of each of the second weights; and
   Associating the pattern with the first language, second language, neither, or both by comparing the first weights and second weights using a geometrical region; and
   Outputting a list of patterns associated with each language.

3. A computer containing a software program system for identifying the language of text, wherein the software program comprises:
   One or more processors;
   A Combination Classifier comprising a plurality of Pattern Classifiers;
   Identifying input text for language classification;
   Presenting the input text to the Combination Classifier;
   Where the Combination Classifier presents the input text to each of the Pattern Classifiers;
   Where each of the Pattern Classifiers produces: a vector of weights where each component of the vector is the weight associated with a particular language;
   Where the Combination Classifier computes a combination weight vector based on the weight vectors produced from the plurality of Pattern Classifier weight vectors; and
   Where the Combination Classifier computes a rank ordered list of languages to associate with the input text based on the combination weight vector.

* * * * *